UNITED STATES PATENT OFFICE.

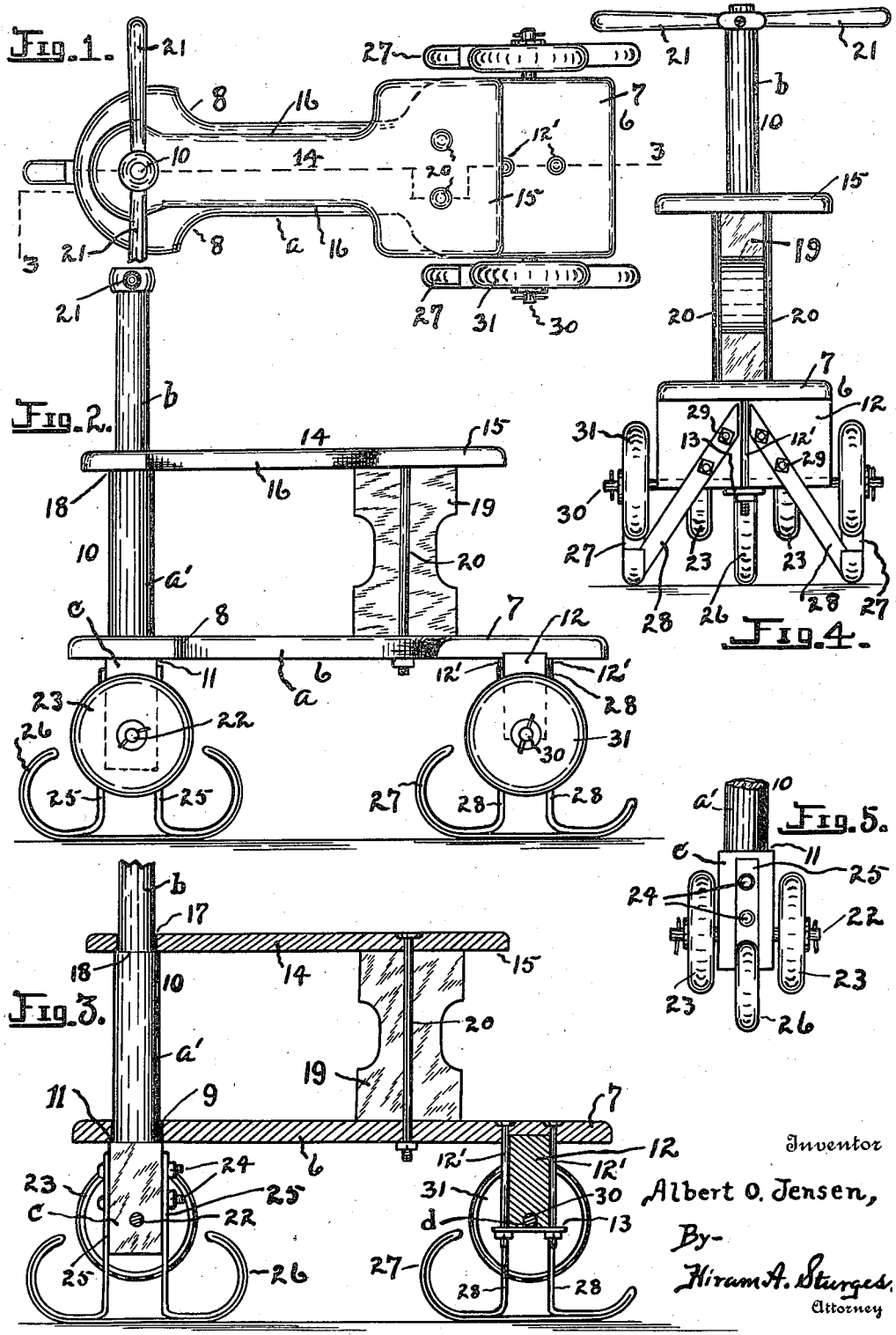

ALBERT O. JENSEN, OF OMAHA, NEBRASKA.

COMBINED WHEEL-COASTER AND SLEIGH.

1,298,729.       Specification of Letters Patent.     Patented Apr. 1, 1919.

Application filed May 20, 1918. Serial No. 235,717.

*To all whom it may concern:*

Be it known that I, ALBERT O. JENSEN, a citizen of the United States, residing at Omaha, in the county of Douglas, and State of Nebraska, have invented certain new and useful Improvements in Combined Wheel-Coasters and Sleighs, of which the following is a specification.

This invention relates to a combined wheel coaster and sleigh, and has for its object to provide a child's vehicle provided with wheels for riding or coasting down inclines, or for being propelled by the rider upon levels by use of the feet, the parts to be so constructed and proportioned that the device may be readily converted into a sleigh to be used in the same manner and for the same purposes, a lower platform being also provided and arranged for use of a second passenger or to provide standing room when coasting. The invention includes the provision of few and simple parts so that manufacture will be practical and economical, will be convenient for assembling and will be durable in wear.

With the foregoing objects in view the invention presents a novel construction, combination and arrangement of parts as described herein and claimed, and as illustrated in the accompanying drawing, wherein,—

Figure 1 is a plan view of the device, one of the handle-bars being broken away. Fig. 2 is a side view of the device. Fig. 3 is a view in longitudinal section of the same, on line 3—3 of Fig. 1, a part of the steering shaft being broken away. Fig. 4 is a rear view of the device. Fig. 5 shows the lower part of the steering shaft and parts mounted thereon, being a front view of the same.

Referring now to the drawing for a more particular description, I provide a lower platform 6 having a width at its rear end sufficient to provide a seat 7, said platform being incised to provide a pair of opposed, elongated recesses $a$ opening on its sides and a pair of foot-supports or ledges 8 adjacent to its front end, said platform having an aperture 9 at its medial line near its front end for receiving therein a circular part $a'$ of the upright steering shaft 10, said platform being adapted to be supported upon a ledge 11 of said shaft. This platform is also provided with a bolster 12 below its seat 7, said bolster being secured thereto by the pair of bolts 12' which are disposed midway between its ends at its sides, said bolts engaging a cross-strip 13 at the lower part of the bolster, the heads of the bolts being countersunk in the upper face of the platform.

Numeral 14 indicates an upper platform having a length less than the length of the lower platform, and having a sufficient width to provide a seat 15 at its rear end, said platform 14 being incised to provide recesses 16 at its sides and being provided at its medial line, near its front end, with an aperture 17 for receiving therein the cylindrical part $b$ of the steering shaft, said front end of the platform being adapted to be supported upon a ledge 18 with which the steering shaft is provided.

Numeral 19 indicates a spacing-block or support disposed below the seat 15 between and at the medial line of the platforms, and secured thereto by the pair of bolts 20 which traverse both platforms, said bolts having their heads countersunk in the upper platform.

The upper end of the shaft 10 is provided with handle-bars 21, its lower end having a part $c$ for a mounting of the axle 22, upon which are mounted a pair of front wheels 23.

The part $c$ of the steering shaft is of block-form or rectangular in cross-section, and the front wheels, preferably are disposed near two opposed faces of the block and comparatively near to each other to facilitate the operation of steering, upon the two remaining faces of said block being secured, by means of bolts 24, the vertical arms 25 of the single runner 26.

Numerals 27 indicate a pair of runners, each being provided with a pair of inclined arms 28 for a mounting upon the respective front and rear sides of the bolster 12 and removably secured thereto by means of suitable bolts or keepers 29.

Numeral 30 indicates an axle for a mounting of the pair of rear wheels 31, said axle being disposed in a slot $d$ formed in the bottom of the bolster 12 and secured therein by means of the cross-bar 13.

As thus described, the platforms 6 and 14 are disposed substantially parallel with reference to each other, at right-angles to the steering shaft, and this shaft, which has bearings in the platforms may be freely rotated for the purpose of steering.

It will be appreciated that the parts may be conveniently assembled, nails or screws being dispensed with. The arms 25 and 28 for the runners may have any desired length so that the wheels will be maintained somewhat above the ground when used upon ice or snow. When it is desired to use the device as a wheeled vehicle or coaster, the runners are removed by removal of the bolts 24 and 29, this interchangeable feature being of great advantage on account of economy and utility.

In operation, a child may ride upon the seat 15, and on account of the provision of the recesses a and 16, the platforms will not be obtrusive while propelling the device; and when coasting down inclines the feet of the rider may rest upon the ledges 8.

The seat 7 of the lower platform may be used to advantage by a rider who places one foot thereon while pushing or propelling with the other foot, the handle-bars 21 being grasped and partly sustaining the weight of the rider during this operation. Also this seat may be used by a second occupant or passenger either in a sitting or standing position.

While I have shown and described details of construction I do not wish to be understood as limiting myself to exactness in this respect, the scope of the invention being determined by the claims.

What I claim as my invention and desire to secure by Letters Patent is,—

1. In combination with a plate provided below its rear end with axially mounted wheels and a pair of removably mounted sleigh-runners below said wheels, a second plate above the first named plate, and a steering-shaft disposed at right-angles to and journaled in said plates, said steering-shaft having a part below the first named plate provided with axially mounted wheels and a removably mounted sleigh-runner, the latter being disposed in a plane midway between said last named wheels.

2. In devices for the purpose described, the combination of an elongated plate, a second elongated plate having recesses opening on its sides and disposed parallel with and above the first named plate, a steering-shaft journaled in the plates near their front ends and having a part below the first named plate for the axial mounting of a pair of wheels and for the support of a sleigh-runner, a bolster below the rear part of the first named plate for the axial mounting of a pair of wheels and to support a pair of sleigh-runners, said first named plate having a greater length than the second plate to provide a seat above the bolster outwardly of the plane of the second plate.

3. In combination with a plate provided below its rear end with a pair of axially mounted wheels and a pair of removably mounted sleigh-runners, a second plate above the first named plate, a steering shaft disposed at right-angles to and journaled in said plates and provided with ledges for engaging said plates, said steering-shaft having a part formed rectangular in cross-section below the first named plate provided adjacent to two opposed sides with axially mounted wheels and also provided, in a plane intermediate said wheels with a removably mounted sleigh-runner.

4. In devices for the purposes described, a plate provided with a bolster below its rear end and having an aperture formed in its front end, said plate being incised intermediate its ends to provide recesses in its sides and a pair of foot-supports adjacent to said aperture, a second plate provided with an aperture, said second plate having a length less than the length of and disposed above the first named plate, a steering shaft engaging in the apertures of said plates and projecting below the first named plate, wheels below the first named plate axially mounted on the steering shaft, wheels axially mounted on said bolster, said bolster and steering shaft providing supports for a removable mounting of a plurality of sleigh-runners normally disposed in a plane below said wheels.

In testimony whereof, I have affixed my signature in presence of two witnesses.

ALBERT O. JENSEN.

Witnesses:
 HIRAM A. STURGES,
 ARTHUR H. STURGES.